United States Patent [19]
Ohkawa et al.

[11] 3,966,594
[45] June 29, 1976

[54] TREATMENT OF AQUEOUS WASTE SOLUTION

[75] Inventors: Masaaki Ohkawa, Takatsuki; Yasuyoshi Sawaguri, Toyonaka, both of Japan

[73] Assignee: Sumitomo Chemical Company, Limited, Japan

[22] Filed: Nov. 25, 1974

[21] Appl. No.: 527,151

[30] Foreign Application Priority Data
Nov. 26, 1973  Japan................................ 48-133181
Mar. 14, 1974  Japan................................ 49-29730

[52] U.S. Cl................................. 210/22 R; 210/21
[51] Int. Cl.² ......................................... B01D 11/04
[58] Field of Search.......................... 210/21, 22, 59

[56] References Cited
UNITED STATES PATENTS

| | | | |
|---|---|---|---|
| 3,074,820 | 1/1963 | Kunin ............................... | 210/21 X |
| 3,215,620 | 11/1965 | Dunning et al. .................. | 210/21 |
| 3,215,622 | 11/1965 | Dunning et al. .................. | 210/21 |
| 3,259,568 | 7/1966 | Jordan et al. ..................... | 210/21 X |
| 3,412,018 | 11/1968 | Monzie .............................. | 210/21 |

*Primary Examiner*—Frank A. Spear, Jr.
*Attorney, Agent, or Firm*—Wenderoth, Lind & Ponack

[57] ABSTRACT

Organic waste water containing water-soluble organic anionic substances is treated by
1. contacting an acidic waste water with a water-insoluble organic solvent solution of at least one amine represented by the formula,

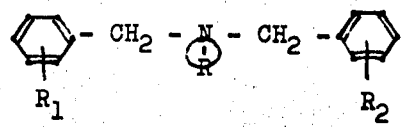

wherein $R_1$ and $R_2$ are each a hydrogen or halogen atom or a $C_1 - C_4$ alkyl group, and R is a $C_8 - C_{18}$ alkyl or alkenyl group, 2. separating the aqueous layer from the organic layer, and
3. contacting said organic layer with an aqueous alkali solution whereby said substances are transferred to said aqueous alkali layer and said amine is recovered as the organic solution thereof.

16 Claims, No Drawings

TREATMENT OF AQUEOUS WASTE SOLUTION

The present invention relates to a treatment of waste water containing water-soluble organic anionic substances. Waste water containing anionic substances such as organic sulfonic acids, organic nitro compounds and phenols is discharged in a large amount as filtrate or washing liquor from manufacturing processes of dye-stuffs, medicines, industrial chemicals and the like, and contains substances of high chemical oxygen demand (referred to as COD hereinafter).

These waste waters are generally treated by forced salting, acid salting, oxidation, coagulation and flocculation and the like which are however insufficient in the effectiveness. Therefore, there are no other methods than submerged combustion of concentrated waste water, which are capable of completely treating these waste waters which are difficult to treat. When these waste waters, however, contain a large amount of inorganic salts, the submerged combustion method is also insufficient industrially in terms of concentration and combustion.

There is known a method for concentrating waste water which contains water-soluble anionic substances, by extracting these substances from the waste water using a liquid cationic ion-exchanger. Extraction of anionic substances from aqueous solutions thereof using an aliphatic higher amine is now well known in J. Soc. Chem. Ind., 67, 48 (1948).

As a method taking advantage of this extraction mechanism, there is a method wherein waste water containing an easily water-soluble anionic substance is acidified, and stirred or shaken violently together with a solution of a higher amine compound in water-insoluble organic solvents, whereby the substance is removed by extraction to give waste water of reduced COD, while the organic layer containing the substance is back-extracted with an aqueous alkali solution of as small amount as one-several tenth that of the original waste water whereby the solution is separated into an organic layer containing recovered higher amine and an aqueous layer containing the substance. The method enables not only a liquor-to-liquor continuous extraction and an effective treatment of waste water which is very difficult to treat, but also reuse of amine compounds, and therefore it is very superior as an industrial method. This process is now well known in many literatures, for example U.S. Pat. Nos. 3,267,029, 3,215,622 and 3,215,620, and Japanese Patent Publication No. 7595/1972.

This amine-extraction method, however, includes many problems to solve. For example, after waste water and an amine solution are violently brought into contact with each other, clear separation of oily layer from aqueous layer is not obtained with formation of emulsified liquor or oil-in-water suspension, so that long-period standing is often required for the two layers to separate from each other. In order to solve these problems, higher amine compounds of improved separating ability have been searched for by altering the chemical structure. For example, tribenzylamine, n-dodecyl-tert.-dodecylamine and trioctylamine are well known in the above-mentioned literatures. But an intermediate layer still forms in general, although in a small amount, between an oily and aqueous layers and remains unchanged, even though the well known amines are used for treatment of waste water containing various anionic substances. This intermediate layer continues to increase in the amount in a cycle of extraction and back-extraction of a large amount of waste water, thus reducing the separating efficiency of aqueous layer from oily layer, increasing the consumption of amine compounds and further adversely affecting the reduction in a COD value of treated waste water.

This phenomenon that the separation of the two layers from each other is prevented by the intermediate layer appears remarkably in the continuous treatment of waste water.

In order to overcome these problems, the inventors have studied to find out amine compounds having the following two characteristics;

1. a high ability to separate an aqueous layer from an oily layer,
2. a property to impart a high solubility in organic solvent to adducts of anionic substances with the amine compounds themselves, and found that dibenzylalkylamines can satisfactorily be applied to the treatment of waste water even though it is a mixture of various kinds of waste water or has a fairly high COD value.

Thus, the present invention is to provide a process for treatment of organic waste water containing water-soluble organic anionic substances, which comprises 1. contacting an acidic waste water with a water-insoluble organic solvent solution of at least one amine represented by the formula,

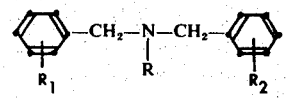

wherein $R_1$ and $R_2$ are each a hydrogen or halogen atom or a $C_1 - C_4$ alkyl group, and R is a $C_8 - C_{18}$ alkyl or alkenyl group,
whereby said substances are transferred to said organic solution, 2. separating the aqueous layer from the organic layer, and 3. contacting said organic layer with an aqueous alkali solution whereby said substances are transferred to said aqueous alkali layer and said amine is recovered as the organic solution thereof.

In the present invention, the alkyl or alkenyl group represented by R in the formula (1) include n- or iso-octyl, n- or iso-decyl, n- or iso-dodecyl, n- or isotetradecyl, n- or iso-hexadecyl, n- or iso-octadecyl and octadecenyl.

As the alkyl groups, there are of course included mixed tertiary amines which are obtained from coconut oil containing all of $C_8H_{17}$, $C_{10}H_{21}$, $C_{12}H_{25}$ and $C_{18}H_{37}$ alkyl groups.

The substituents on benzene nucleus of the benzyl group represented by $R_1$ and $R_2$ include methyl, ethyl, propyl, butyl, chlorine and bromine.

Examples of the amines represented by the formula (1) include dibenzyloctylamine, dibenzyl-iso-octylamine, dibenzyl-n-decylamine, dibenzyl-n-dodecylamine, dibenzyl-tetradecylamine, dibenzyl-hexadecylamine, dibenzyl-octadecylamine, dibenzyl-octadecenylamine, di-o-chloro- or bromo-benzyl-dodecylamine, di-p-methylbenzyl-dodecylamine, di-p- n-butylbenzyl-dodecylamine, benzyl-p-chlorobenzyl-dodecylamine and the like.

The tertiary amines according to the present invention can be prepared by reacting a primary amine with a benzyl halide derivative, such as benzylchloride, of more than 2 times by mole based on the amine in the presence or absence of solvent. The reaction can smoothly be effected by adding an alkali agent equivalent to an acid produced, for example caustic alkali or alkali carbonates itself or its aqueous solution. The tertiary amines produced sometimes caontain monobenzyl alkyl or alkenyl amine as a by-product in a small amount, for example 5 to 10 % thereof, but the amount of this order does not affect the extraction. The tertiary amine thus obtained can be used as it is without purification, after removal of water and inorganic salts.

As the water-insoluble organic solvents for dissolving the present tertiary amines, there are exemplified aromatic hydrocarbons such as benzene, toluene, xylene, trimethylbenzene, mono-, di- or tri-ethylbenzene, chloronaphthalenes and methylnaphthalenes; halogenated aliphatic hydrocarbons such as chloroform dichloroethane and perchlene, and preferably toluene and xylene are used. If necessary, a combination of aforesaid organic solvent with the aliphatic alcohols can be preferably used. The amines are generally used in the form of a 1 to 50 % solution in the solvents. The separating ability can effectively improved by an addition of a small amount of water-soluble cationic surfactant.

As the water-soluble cationic surfactants referred to herein, there are exemplified water-soluble secondary or tertiary amines, quarternary ammonium salts or pyridinium salts having at least one polyoxyethylene group, among which tert.-polyoxyethylenealkylamines such as dipolyoxyethylene-octadecylamine, which is commercially available as Nymeen 220 (Nippon Yushi), DS-79 (Marubishi Yuka) and Ameto (Kao Sekken), are particularly preferred.

These surfactants are preferably used in the form of their aqueous solution.

Waste water which can be treated by the method according to the present invention is specifically those which are mainly discharged from dye works, industrial chemical works, dyeing works, medicine works and the like, for example waste water containing sulfonated aromatic compounds such as benzene-, naphthalene- and anthraquinone-sulfonic acids, dyestuffs having at least one sulfonic group, nitro compounds, and phenols. By the present method, even waste water having a COD value as high as 15,000 to 20,000 p.p.m. (measured according to JIS K-0102) can sufficiently be treated, with a subsidiary effect of largely reducing the color depth of waste water in most cases.

In the practice of the present process, pH of the waste water to be treated is first adjusted preferably to less than 2, particularly preferably to 0.5 to 1.5 by the addition of hydroxides of alkali metal and alkaline earth metal or aqueous ammonia, or acids such as sulfuric acid and hydrochloric acid. Therefore, in a multistage extraction process, initial acidity of waste water to be treated must be adjusted so that the waste water may have a pH of less than 2 at the end of the process. When a large amount of insoluble matter are produced by adjusting the pH of the waste water to be treated, it is preferred to remove the matter by filtration prior to the amine-extraction.

A solution of the amine in organic solvent is added to the acidic waste water and the mixture is stirred or shaken for several minutes or more. The amount of amine added is 1 to 50 % by weight, generally 5 to 15 % by weight, based on the weight of the waste water. The addition and stirring (or shaking) are carried out at 10° to 80°C., usually at 20° to 40°C.

The above-mentioned cationic surfactants are preferably added to the waste water just before or during addition of the amine solution. The amount thereof is about 0.001 to 0.1 % by weight based on the weight of the waste water. A larger amount may be added, but with no effect. Furthermore, the amount of surfactant added is so small that an effect of the surfactant on COD value is negligibly small.

Separation into an aqueous and oily layers occurs very rapidly, and the oily layer containing organic anionic substances is separated from aqueous layer and then subjected to the subsequent alkali back-extraction using an aqueous alkali solution. The alkalis used for the back-extraction are water-soluble ones such as hydroxides of alkali metal or alkaline earth metal and aqueous ammonia. That is, said organic layer is stirred or shaken for several minutes or more together with the aqueous alkali solution in such amount that pH of a lower aqueous layer is made 7 or more, then it separates into an upper organic layer containing the amine and a lower aqueous layer containing water-soluble organic substances (hereinafter referred to as a high COD-liquor). The temperature at which the alkali back-extraction is carried out depends upon the concentration of alkali, and it is generally from room temperature (10° to 20°C.) to 80°C. The concentration of the aqueous alkali solution is preferably 10 to 50 % by weight (converted to caustic soda), and a higher concentration is advantageous because the volume of a high COD-liquor which is finally separated from the amine-containing organic layer becomes smaller. But, the aqueous alkali solution of too high concentration causes an increase in the viscosity of high COD-liquor so that it is necessary to warm the liquor. The high COD-liquor contains most of the organic anionic substances in the initial waste water and has a volume much smaller than that of the waste water, for example the smallest of about 1/30 by volume ratio. It is treated by, for example, combustion.

Thus, according to the present invention, separation into two layers can be achieved very rapidly with no formation of intermediate layer, and waste water can be reduced in its COD value with removal of 75 to 90 %.

The method according to the present invention displays its remarkable effect in a long-period continuous treatment of a large amount of waste water. The continuous treatment is carried out by means of a mixer-settler process or countercurrent process.

The present invention will be illustrated with reference to the following examples, which are only given for the purpose of illustration and not to be interpreted as limiting thereto. All parts and percentages in the exampls are by weight. The qualities of waste water and treated waste water are expressed by COD according to the Mn method (JIS-K-0102) and coloration degree according to the method recommended by American Public Health Association (referred to as APHA value hereinafter).

EXAMPLE 1

In a four-necked flask equipped with an outlet having stoppers at the bottom, were placed 100 parts of waste water (pH 1.6, COD 16,000 p.p.m., APHA value 30,000) from filtration of disodium 1-amino-8-hydroxynaphthalene-3,6-disulfonate, and 25 parts of a 20 % dibenzyldodecylamine solution in toluene. The mixture was violently stirred for about 5 minutes at room temperature and, on standing, immediately separated into an aqueous layer and an oily layer. The lower aqueous layer separated was 98.5 parts and had COD of 2,900 p.p.m. and APHA value of 3,100 A.

After adding 10 parts of a 10 % aqueous caustic soda solution to the oily layer, the mixture was stirred for about 5 minutes at room temperature, and on standing separated into 24.8 parts of an amine-toluene layer and 11 parts of an aqueous layer. The former solution could repeatedly be used, and the latter had a volume of about one-tenth that of the original waste water.

EXAMPLE 2

The procedure was carried out in the same manner as described in Example 1, using 30 parts of a 20 % dibenzyloctadecenylamine solution in toluene, and 100 parts of a 2-fold dilute liquor (pH 1) of the combined waste water obtained from filtration of naphthalene-1,5-disulfonic acid and 2-naphthol-3,6-disulfonic acid. The waste water clearly separated into an aqueous layer and oily layer. The aqueous layer was 99 parts and was remarkably reduced in COD (3,600 p.p.m.) and APHA value (2,500Y), compared with the original waste water (COD 18,000 p.p.m., APHA value 8,000 Y).

In the same manner as described in Example 1, the oily layer was treated with 10 parts of a 10 % aqueous caustic soda solution to recover 29.0 parts of an amine-toluene solution.

The above Example was repeated, provided that 9.3 parts of a 10 % aqueous calcium hydroxide suspension was used in place of 10 parts of a 10 % aqueous caustic soda solution, and then the same result was obtained.

Dibenzyloctadecenylamine used herein was prepared as follows.

In a closed vessel equipped with a stirrer and a reflux condenser were placed 80 parts of oleylamine, 80 parts of toluene and 80 parts of a 30 % aqueous caustic soda solution, and then 76 parts of benzylchloride were added dropwise thereto at 70°C. while stirring. The reaction was completed by keeping at 70° to 80°C. for 3 hours while stirring. After cooling to room temperature, the reaction mixture was filtered to remove sodium chloride. Thus, 210 parts of a 64.0 % dibenzyloctadecenylamine solution in toluene were separated as an oily layer.

EXAMPLE 3

Using 100 parts of waste water (pH 0.5) from filtration of 1-amino-2-naphthol-4-sulfonic acid, and 25 parts of a 5 % di-p-methylbenzyl-octylamine in xylene, the procedure was carried out in the same manner as described in Example 1 to obtain an aqueous layer and oily layer separated.

The treated waste water was reduced in COD (3,500 p.p.m.) and APHA value on neutralization (5,000), compared with the original waste water (COD 12,000 p.p.m., APHA value on neutralization 250,000). The oily layer was treated in the same manner as in Example 1 to obtain 24.5 parts of an amine-toluene solution.

EXAMPLE 4

To 24.5 parts of the amine-toluene solution recovered in Example 3 were added 100 parts of combined waste water (pH 3.0, COD 13,500 p.p.m., APHA value on neutralization 120,000) from filtration of 2-amino-8-naphthol-6-sulfonic acid and 2-amino-phenol-4-sulfonic acid, and the mixture was violently stirred for 5 minutes at room temperature. When stirring was stopped, the mixture immediately separated into an aqueous layer and oily layer. The aqueous layer obtaind was 99.0 parts in weight and had COD of 2,500 p.p.m. and APHA value of 4,500 A.

After adding 5 parts of a 30 % aqueous caustic soda solution to the oily layer, the mixture was violently stirred for about 5 minutes at room temperature, and on standing immediately it separated into 24.0 parts of an amine-toluene layer and about 6 parts of an aqueous layer. The latter layer had a volume of about one-twentieth that of the original waste water.

EXAMPLE 5

Treatment of different waste waters was carried out using different amine compounds and the results were summarized in the following table. The amines were used in the same proportion as in Example 1.

| Amines | Solvent | Waste water | Removal percentage of COD | Removal percentage of APHA value |
|---|---|---|---|---|
| 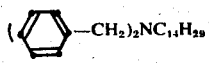 $(C_6H_5-CH_2)_2NC_{14}H_{29}$ | perchlene | filtrate from filtration of disodium 1-amino-8-naphthol-3,6-disulfonate | 85 % | 97 % |
| 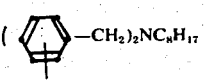 $(4\text{-}CH_3\text{-}C_6H_4\text{-}CH_2)_2NC_8H_{17}$ | n-octanol | same as above | 87 % | 97 % |
| 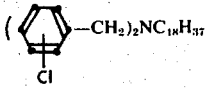 $(4\text{-}Cl\text{-}C_6H_4\text{-}CH_2)_2NC_{18}H_{37}$ | toluene | filtrate from filtration of 1-amino-2-naphthol-4-sulfonic acid | 85 % | 95 % |

| Amines | Solvent | Waste water | Removal percentage of COD / Removal percentage of APHA value |
|---|---|---|---|
| (dibenzyl)(CH₃-substituted)N—C₁₂H₂₅ structure | trichloroethylene | same as above | 88 % / 96 % |

EXAMPLE 6

In a 1,000 ml. four-nacked flask were placed 500 ml. of waste water from alkali washing of nitrotoluene, and acidified to pH of 1.5 with a dropwise addition of a 70 % sulfuric acid. Then, 100 ml. of a solution comprising 15 % of dibenzyldodecylamine, 5 % of n-octanol and 80 % of toluene were added thereto and the mixture was stirred for 20 minutes at 50°C. The mixture was transferred to a separating funnel and, on standing for 15 minutes, separated into two layers.

After adding 10 ml. of a 10 % aqueous caustic soda solution to the oily amine layer separated, the mixture was throughly stirred at room temperature and on standing for some time it separated into an aqueous layer (a high COD-liquor) and an oily layer (a recovered amine solution).

Using the recovered amine solution, the treated waste water from the first extraction as re-extracted in the same manner as mentioned above. Thus, by repeating the extraction two times, COD and APHA value of the original waste water were decreased from 3,630 p.p.m. to 210 p.p.m. and from more than 5,000 to less than 200, respectively.

On the other hand, the slightly contaminated, oily amine layer separated at the second extraction was used, without an alkali back-extraction, for the first extraction of the original waste water, and then back-extracted with alkali. The high COD-liquor separated at the back-extraction was acidified to pH of 2 with a 70 % sulfuric acid to separate into a tarry layer and an aqueous layer. The latter layer was mixed with the original waste water and the tarry matter was subjected to combustion after washing.

Another example was carried out in the same manner as mentioned above, except that a solution comprising 15 % of dibenzyldodecylamine and 85 % of toluene was used as an extracting agent. Thus, COD and APHA value of the original waste water were decreased from 3,630 p.p.m. to 390 p.p.m. and from more than 5,000 to 500, respectively.

EXAMPLE 7

The procedure was carried out in the same manner as described in Example 6, except that waste water from washing of p-nitroanisol (COD 33,264 p.p.m., APHA value 3,600) was used. COD and APHA value of the treated waste water thus obtained were 160 p.p.m., and 200, respectively.

Another example was carried out in the same manner as mentioned above, except that a 15 % dibenzyldodecylamine solution in toluene was used as an extracting agent. COD and APHA value of the treated waste water thus obtained were 270 p.p.m. and 1,100, respectively.

EXAMPLE 8

In a 1,000 ml. four-necked flask were placed 500 ml. of waste water (pH 5, COD 13,700 p.p.m., APHA value 4,500) from preparation of 4-nitro-m-cresol which contained nitrocresols as a major component, and acidified with a drop-wise addition of a 70 % sulfuric acid to pH of 1.5. Next, 100 ml. of a 20 % dibenzyl-dodecylamine solution in toluene were added thereto followed by stirring at 50°C. for 20 minutes. The mixture was then transferred to a separating funnel and on standing for 15 minutes it separated into two layers.

After adding 10 ml. of a 10 % aqueous caustic soda solution to the oily amine solution separated, the mixture was thoroughly stirred for 10 minutes at room temperature and, on standing for some time, it separated into an aqueous layer (a high COD-liquor) and an oily layer (a recovered amine-toluene solution).

Using the recovered amine solution, the treated waste water from the first extraction was re-extracted in the same manner as mentioned above. The treated waste water thus obtained had COD of 250 p.p.m. (removal 98 %) and APHA value of less than 200. The slightly contaminated, oily amine-toluene layer recovered at the second extraction was used as it is for the first extraction of the original waste water, and then back-extracted with alkali.

The high COD-liquor obtained at the back-extraction was acidified to pH of 2 with a 70 % sulfuric acid to separate into a tarry layer and an aqueous layer. The latter layer was mixed with the original waste water and the tarry manner was subjected to combustion after washing.

The same procedure was carried out ten times using the same waste water, as the result of which a mean COD and mean APHA value obtained were 270 p.p.m. (removal 98 %) and 200, respectively.

EXAMPLE 9

The procedure was carried out in the same manner as described in Example 8, except that a 20 % dibenzyloctadecenylamine solution in toluene, and a mixed waste water (pH 1, COD 12,000 p.p.m., APHA value 7,500 Y) comprising 54 % by volume of waste water from preparation of O,O-dimethyl-O-3-methyl-4-nitrophenylthiophosphate and 46 % by volume of waste water from preparation of 4-nitro-m-cresol were used. The mean COD and mean APHA value of the treated waste water thus obtained were 330 p.p.m. (removal 97 %) and less than 200, respectively. In this treatment, acidicication of waste water was omitted because the original mixed waste water had pH of 1.

EXAMPLE 10

The procedure was carried out in the same manner as described in Example 8, except that a mixed waste water (COD 7,000 p.p.m., APHA value 6,800) comprising 60 % by volume of waste water from alkali washing of nitrotoluene, 30 % by volume of waste water from alkali washing of chloronitrobenzene and 10 % by volume of waste water from washing of p-nitroanisol. The mean COD and mean APHA value of the treated waste water thus obtained were 700 p.p.m. (removal 90 %) and 500, respectively.

EXAMPLE 11

1,000 parts of waste water (pH 9.0, COD 18,000 p.p.m., APHA value 25,000 Y, phenol-content 12,000 p.p.m.) from preparation of intermediates for disperse dyes were acidified to pH of 1.0 with 52 parts of a 20 % sulfuric acid. The phenol-content was measured on gas-chromatography, and APHA value was measured at pH of 7.0.

In a flask having an outlet at the bottom, were placed 1,000 parts of the acidified waste water and 50 parts of a 20 % dibenzyldodecylamine solution in toluene, and the mixture was violently stirred for 5 minutes. On standing for some time, it separated into an aqueous layer (treated waste water) and an upper oily layer. The treated waste water (pH 1) was remarkably reduced in phenol content (30 p.p.m.), APHA value (2,000 Y) and COD (2,000 p.p.m.), compared with those of the original waste water.

Next, 50 parts of a 20 % aqueous caustic soda solution were added to the oily layer separated, and the mixture was violently stirred. On standing for some time, it separated into a dark brown lower aqueous alkaline layer and an upper amine-toluene layer. The lower aqueous alkaline layer was separated and neutralized with hydrochloric acid to separate about 10 parts of black crude phenol.

The recovered amine-toluene solution could also be reused, with completely the same effect, for treatment of 1,000 parts of the waste water which had been adjusted to pH of 1.

EXAMPLE 12

A continuous waste water treatment using two pairs of mixer and settler (volume ratio 1:3), the first pair being for extraction, the second pair for back-extraction, was carried out, using a 20 % dibenzyldodecylamine solution in toluene, 10 % aqueous caustic soda solution and as waste water, a combined filtrate (pH 1.0, COD 16,500 p.p.m.) comprising the same amount of filtrates from preparations of H-acid, 1-amino-2-naphthol-4-sulfonic acid, R-acid and chromotropic acid.

The operation condition of the process was controlled so that a temperature of each pair was 30°C., time taken for waste water to pass through each pair being 20 minutes, feed to the mixer of the first pair being 100 parts/hr. of the waste water and 35 parts/hr. of the dibenzyldodecylamine-toluene solution, and upper amine layer in the settler of the first pair and 15 parts of 10 % aqueous caustic soda solution being charged to the mixer of the second pair. The operation was carried out with an without an addition of 1 part/hr. of 0.1 % aqueous solution of DS-79 (a trade mark of polyoxyethylene octadecylamine sold by Marubishi Yuka Co.) to the mixer of the first pair.

The result was that, when DS-79 was used, any abnormality in waste water flow was never observed even after 144 hours' running, while that, in another case, a slight intermediate layer containing minute oil droplets was gradually increased in the course of 48 hours' running in the settler of the first pair whereby waste water discharged from the settler became to contain a slight amount of minute droplets.

The COD values of treated waste water in each case was about 3,500 p.p.m. with no large difference, during the normal running.

EXAMPLE 13

The procedure was carried out in the same manner as described in Example 12, except that a 20 % di-p-methyl-benzyl-dodecylamine solution in xylene, a 0.1 % aqueous solution of Ameto (a trade mark of cationic surfactant sold by Kao Sekken Co.) and, as waste water, a mixture (pH 10.5, COD 10,200 p.p.m., APHA value 150,000 M) of 5 different waste water (filtrate and washing liquor) from preparation of reactive dyes were used.

As the result, a continuous operation could be carried out without abnormality for as long as 120 hours.

In reference example using no surfactant, a foamy suspension began to appear within the aqueous layer in the first settler after about 35 hours.

The COD values of treated waste water in each case was about 3,200 p.p.m. with no large difference during the normal running.

REFERENCE 1

To 100 parts of waste water from preparation of 2-naphthalene sulfonic acid were added 20 parts of toluene and 5 parts of tribenzylamine (prepared from 1 mole of benzylamine and 2 moles of benzylchloride according to Example 2), and the mixture was violently stirred. A layer comprising sulfonic acid-amine adduct was separated, as a third layer, from an aqueous and oily layer thus making impossible recovery of amine-toluene solution unlike the present invention.

REFERENCE 2

To 100 parts of waste water from preparation of 2-naphthalene sulfonic acid were added 20 parts of toluene and 5 parts of N-benzyl-stearylamine (prepared from 1 mole of stearylamine and 1 mole of benzylchloride according to Example 2), and the mixture was violently stirred. The mixture was completely emulsified and did not separate into two layers even after standing overnight. The same result was also observed using perchlene in place of toluene.

REFERENCE 3

Using each of the following amine compounds as a 20 % solution in toluene, an extraction treatment of waste water (pH 1.0) was carried out in the same manner as described in Reference 1.

The results obtained are as shown in the table.

| Amine | Waste water | COD | State (15 minutes after extraction) |
|---|---|---|---|
| Dibenzylamine | Filtrate from reactive dye preparation | 10,200 | Formation of aqueous, toluene and amine-adduct layers. Separation was difficult. |
| Di-n-dodecyl-amine | " | 10,200 | Emulsified intermediate layer occupied most of the total liquor volume, with formation of a small amount of lower aqueous layer. |
| Didodecyl-methylamine | " | 10,200 | Same as above. |
| N-benzyl-dodecylamine | " | 10,200 | The whole was emulsified. |
| N,N-dimethyl-stearylamine | " | 10,200 | Same as above. |
| Dibenzyl-cyclohexylamine | " | 10,200 | Aqueous layer was separated, but a large amount of emulsion remained. |

What we claim is:

1. A process for treatment of organic waste water containing water-soluble organic anionic substances, which comprises
   1. contacting an acidic waste water with a water-insoluble organic solvent solution of at least one amine represented by the formula,

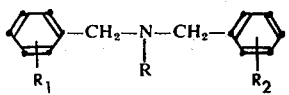

wherein $R_1$ and $R_2$ are each a hydrogen or halogen atom or a $C_1 - C_4$ alkyl group, and R is a $C_8 - C_{18}$ alkyl or alkenyl group,
   whereby said substances are transferred to said organic solution,
   2. separating the aqueous layer from the organic layer, and
   3. contacting said organic layer with an aqueous alkali solution whereby said substances are transferred to said aqueous alkali layer and said amine is recovered as the organic solution thereof.

2. The process according to claim 1, wherein pH of the acidic waste water is less than 2.

3. The process according to claim 1, wherein said amine is dibenzyl-octylamine, dibenzyl-iso-octylamine, dibenzyl-n-decylamine, dibenzyl-n-dodecylamine, dibenzyl-tetradecylamine, dibenzyl-hexadecylamine, dibenzyl-octadecylamine, dibenzyl-octadecenylamine, di-o-chloro- or bromo-benzyl-dodecylamine, di-p-methylbenzyl-dodecylamine, di-p-n-butylbenzyl-dodecylamine or benzyl-p-chlorobenzyl-odecylamine.

4. The process according to claim 1, wherein the amount of amine is 1 to 50 % by weight based on the weight of said waste water.

5. The process according to claim 1, wherein the amine concentration in organic solvent solution is 1 to 50 % by weight.

6. The process according to claim 1, wherein said organic solvent is at least one member selected from the group consisting of aromatic hydrocarbons, halogenated aliphatic hydrocarbons and aliphatic alcohols.

7. The process according to claim 1, wherein the contacting in step (1) is conducted at a temperature of 10° to 80°C.

8. The process according to claim 1, wherein the alkali used in step (3) is a hydroxide of alkali metal or alkaline earth metal, or aqueous ammonia.

9. The process according to claim 1, wherein the concentration of the aqueous alkali solution used in step (3) is 10 to 50 % by weight.

10. The process according to claim 1, wherein the contacting in step (3) is conducted at a temperature of 10° to 80°C.

11. The process according to claim 1, wherein the contacting in step (1) is conducted in the presence of a water-soluble cationic surfactant.

12. The process according to claim 11, wherein the water-soluble cationic surfactant is a member of secondary or tertiary amines, quarternary ammonium salts or pyridinium salts having at least one polyoxyethylene group.

13. The process according to claim 11, wherein the water-soluble cationic surfactant is used in an amount of 0.001 to 0.1 % by weight based on the weight of the waste water.

14. The process according to claim 1, wherein the organic waste water contains sulfonated aromatic compounds.

15. The process according to claim 1, wherein the organic waste water contains dyestuffs having at least one sulfonic group.

16. In a process for treatment of organic waste water containing water-soluble organic anionic substances by (1) contacting an acidic waste water with a water-insoluble organic solvent solution of an amine, (2) separating the aqueous layer from the organic layer, and (3) contacting said organic layer with an aqueous alkali solution whereby said substances are transferred to said aqueous alkali layer and said amine is recovered as the organic solution thereof, an improvement which comprises using as said amine at least one amine of the formula,

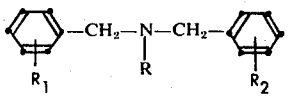

wherein $R_1$ and $R_2$ are each a hydrogen or halogen atom or a $C_1 - C_4$ alkyl group, and R is a $C_8 - C_{18}$ alkyl or alkenyl group.

* * * * *